(12) United States Patent
Dykstra et al.

(10) Patent No.: US 9,555,580 B1
(45) Date of Patent: Jan. 31, 2017

(54) FRICTION STIR WELDING FASTENER

(71) Applicant: Temper IP, LLC, Rockford, MI (US)

(72) Inventors: William C. Dykstra, Rockford, MI (US); Luke A. Martin, Wyoming, MI (US)

(73) Assignee: TEMPER IP, LLC., Rockford, MI (US)

( * ) Notice: Subject to any disclaimer, the term of this patent is extended or adjusted under 35 U.S.C. 154(b) by 493 days.

(21) Appl. No.: 14/219,600

(22) Filed: Mar. 19, 2014

Related U.S. Application Data

(60) Provisional application No. 61/803,841, filed on Mar. 21, 2013.

(51) Int. Cl.
  *B32B 37/00* (2006.01)
  *B29C 65/06* (2006.01)
  *B23K 20/12* (2006.01)
  *B23K 15/00* (2006.01)

(52) U.S. Cl.
  CPC ......... *B29C 65/0672* (2013.01); *B23K 15/008* (2013.01); *B23K 20/12* (2013.01); *B23K 20/122* (2013.01)

(58) Field of Classification Search
  CPC ... B29C 65/0672; B23K 15/008; B23K 20/12; B23K 20/122
  USPC ...... 156/73.1, 73.5, 580.1, 580.2; 228/110.1, 228/1.1
  See application file for complete search history.

(56) References Cited

U.S. PATENT DOCUMENTS

| | | | |
|---|---|---|---|
| 6,669,075 B2 | 12/2003 | Colligan | |
| 6,694,597 B2 | 2/2004 | Wang et al. | |
| 7,645,104 B2 | 1/2010 | Denham et al. | |
| 8,100,311 B2* | 1/2012 | Ostersehlte | B23K 20/123 228/112.1 |
| 8,678,268 B1* | 3/2014 | Obadtich | B23K 20/126 228/112.1 |
| 2005/0281632 A1 | 12/2005 | Donhauser | |
| 2009/0140027 A1* | 6/2009 | Badarinarayan | B23K 20/1265 228/114.5 |
| 2010/0282718 A1* | 11/2010 | Ananthanarayanan | B23K 11/115 219/118 |

* cited by examiner

*Primary Examiner* — James Sells
(74) *Attorney, Agent, or Firm* — Gardner, Linn, Burkhart & Flory, LLP

(57) ABSTRACT

A heat assisted friction stir welding system and fastener for use therewith allows the joining a variety of dissimilar materials, including joining composites and plastics to metal, in which the fastener becomes part of the bond. The fastener can be constructed from multiple materials, allowing for the joining of dissimilar metals. Heating the materials to be joined reduces the clamping force and torque required by the friction stir weld process. The result is a bond that is stronger with less energy input.

30 Claims, 24 Drawing Sheets

FRICTION STIR WELDING FASTENER

CROSS REFERENCE TO RELATED APPLICATION

The present application claims the filing benefits of U.S. provisional application Ser. No. 61/803,841, filed Mar. 21, 2013, which is hereby incorporated herein by reference in its entirety.

FIELD OF THE INVENTION

The present invention relates to a fastener that joins two or more substrates or objects together, such as two or more metal or non-metal substrates or objects.

BACKGROUND OF THE INVENTION

Fastening dissimilar materials has proven challenging. Friction stir welding allows for the joining of dissimilar metals, but the torque required to hold the materials in place so they do not spin is quite high. That is why most friction stir welding applications involve flat parts or parts with flat contours. More complicated parts such as those used in the automotive industry require more extensive clamping. Further, friction stir welding does not completely support the joining of some dissimilar metals, such as steel and magnesium or steel and titanium, or metals to plastics or composite materials. Instead, adhesives or rivets are used. However, adhesives are typically weaker than the materials being joined and rivets are susceptible to fatigue fractures and galvanic corrosion, making them unsuitable for joining dissimilar materials for use in high stress applications.

SUMMARY OF THE INVENTION

The present invention provides a fastener and method for joining a variety of dissimilar materials, including, but not limited to, steel, aluminum, magnesium, plastic, plastic composites, or any combination thereof. The fastener and method of the present invention provides a friction stir welding process that provides enhanced joining of two or more similar or dissimilar materials. The fastener comprises a head and a shaft portion. The shaft portion is configured to protrude through a top object and engage a bottom object (where the objects may comprise any two objects of similar or dissimilar materials, and any shape or form, such as two metal or plastic or composite panels or substrates or the like). The head of the fastener does not protrude through the top object. The fastener is rotated, vibrated, oscillated or a combination thereof to friction stir weld the fastener to at least one of the objects, thereby fastening two or more objects together. Optionally, induction heating may be added to the friction stir welding process. Adding induction heating softens the material or materials of the objects to be joined, thereby reducing the amount of energy input (friction, pressure, torque or other) needed by the friction stir welding process.

These and other objects, advantages, purposes and features of the present invention will become more apparent upon review of the following specification in conjunction with the drawings.

DESCRIPTION OF THE PREFERRED EMBODIMENTS

Figure 1:
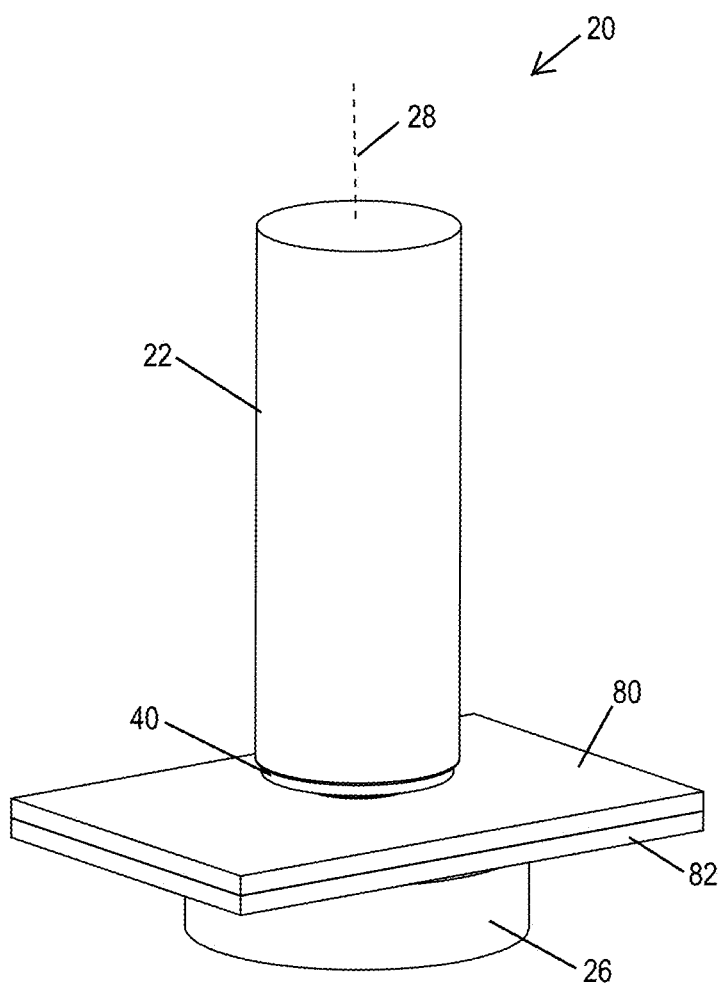
FIG. 1 is a perspective view of a friction stir weld apparatus joining two objects in accordance with the present invention.

The present invention provides an induction-assisted hybrid joining of dissimilar materials concept that is a novel method for joining a variety of dissimilar materials, including, but not limited to, steel, aluminum, magnesium, plastics, plastic composites, or any combination thereof, for example. The process uses a one-step multi-material hybrid fastener to overcome existing technologies' current limitations. The fastener is revolutionary in that it combines, depending on the application, various aspects of rivets, bolts, friction stir welding (FSW), and adhesives. The induction heating process may utilize aspects of the processes described in U.S. Pat. No. 8,479,552 and/or U.S. patent application Ser. No. 12/124,347, filed May 21, 2008, and/or Ser. No. 13/111,399, filed May 19, 2011, which are hereby incorporated herein by reference in their entireties.

The apparatus and fastener and system of the present invention may fasten one of the more challenging material combinations: a composite-to-metal substrate. For this combination, a multi-material fastener is envisioned that will effectively clamp a composite in place after drilling through one material and bonding itself to another material.

The system of the present invention has three major components: a spinning mandrel driver, an induction heating supply, and a hybrid button fastener. The process begins by spinning the mandrel driver to engage the button and to move it into position. An operational illustration and design features of the button concept can be seen in the drawings and is discussed in detail below. The self-drilling button cuts away the composite material until it reaches the base metal. The base metal and/or button fastener is preheated through induction and/or during the drilling process as well as to assist in FSW the button to the base material. Finally, the induction heating supply using the same or different frequency, or other heat source, initiates an adhesive used to bond the button head to the composite or initiates an expandable material to isolate the button from the composite material to reduce the possibility of corrosion between the materials. The technology, however, could easily be expanded to create a button that is capable of joining dissimilar metals. For example, the button can be made of a "bridging" alloy that creates a hybrid weld between steel and magnesium.

The target for the button's performance is to meet or exceed the automotive performance standards of an equivalent traditional technology. The fastener may be configured specifically for metal-to-composite joints. In these applications, adhesives constitute the common fastening technology. Therefore, the button must be capable of meeting or exceeding an equivalent adhesive joint. Adhesively bonded composites are tested according to ASTM D5868 for lap-shear joints; however, welded components, such as the joint between the button and metal substrate, typically undergo pull tests. The button of the present invention overcomes challenges of known adhesive and riveting attachment techniques. While the button may optionally make use of an adhesive, the adhesive (if used at all) is not the primary method for bonding to the composite. Rather, the purpose of the adhesive is to reduce fatigue by limiting the movement of the composite through fortifying the end constraints and limiting torsion. The adhesive does not act as a load-bearing element. Additionally, the fatigue life of a welded joint—in this case, the button welded to the base metal—is significantly higher than that of a riveted joint. Corrosion can be reduced or eliminated with the button because the button would be made from the same material (or a base material alloy that is selected to not induce corrosion) as the base metal. In this case, the galvanic action would become zero, further reinforcing the hybrid button as a superior fastening technology. In cases where it is desired to make the button from a material that may cause a corrosive reaction between one or more materials to be joined, and adhesive, foam, elastomer, or other like material can be incorporated into the button design to isolate the reactive materials from each other.

The button concept of the present invention has the potential to change the way automobiles are assembled. The button enables the use of aluminum, magnesium, steel, plastics, and plastic composites to be integrated into automotive body structures that are not available today. This allows designers to choose materials based on design requirements. For example, enclosures can be made from carbon fiber or aluminum, while undercarriage components can be fabricated using magnesium or steel without the use of elaborate bolt or rivet joints. The result is a lighter-weight vehicle structure.

The button may include a self-drilling feature that, after the drilling process is complete, the rotational and/or downward pressure forces would then be used to supply the torque required to perform the FSW process. During the FSW process, the desired or required temperature of and pressure on the plastic composite are preferably maintained without damaging the composite. Induction heating may be used to at least partially heat the top or bottom or both or all of the components to be joined, to assist at least partially any of the process steps.

Adding induction heating to the friction stir welding process will reduce the torque required for the drilling process or the FSW process or both. The added heating (and softening) of the material due to induction heating will reduce the amount of energy input (friction, pressure, torque or other) needed by the friction stir welding process. Induction assisted friction stir welds will be faster and require less clamping force to hold the components in place.

Optionally, the stir weld fastener or button of the present invention may comprise a stir weld fastener (which may be in a button type design), which may reduce heat buildup and create a stronger joint. Stir welding generates heat, but if the welding head is a button and becomes welded to the part and left there, the heat stays with it. This means the actual stir welding equipment needs less cooling. Also, welding the button and leaving it attached to the material increases the thickness. The button acts as a doubler plate of sorts to increase the strength of the joint.

The disposable stir weld buttons can join materials that could not be joined otherwise. Stir welding is capable of joining many dissimilar materials, however, some alloys just don't mix. In this case, the button can be manufactured from an alloy with the dissimilar materials, effectively becoming a "bridging" material. The materials do not have to weld to each other, rather the materials weld to the button and the button links the components together.

The stir weld fastener or rivet of the present invention can be used to join materials that don't mix. In the event that a "bridging" material cannot be found, a stir welding rivet can be used to join materials together. The head of the rivet welds to the first material while the bottom of the rivet is swedged to hold the second material in place. This may be particularly useful for metal-to-plastic attachments.

A self-drilling stir head may be provided at the fastener that creates its own hole through one or more of the materials. Joining composites (carbon fiber) to metal is particularly difficult. Typical composites don't like to melt, therefore a hole must be drilled through the composite to join to the base material. The self-drilling FSW fastener or button drills its own hole through the composite and then proceeds to weld to the metal, locking the composite to the metal.

Utilizing a self-drilling stir head with adhesive will bond better to plastics and composites. A heat activated adhesive can be added to any of the button/rivet concepts. The adhesive further strengthens the plastic-to-button/rivet joint.

Joints can be made using interlocking features. Interlocking features can be used to temporarily join dissimilar materials while an adhesive cures and to provide a locking feature to support the bond once curing is complete.

The rivets/buttons can be made from multiple materials. The button can be made from different metals using a deposition process. This means the bottom portion of the rivet could be steel and the top portion could be magnesium. Or the drilling point of the self-drilling head could be carbide while the body is a steel that transitions to a metal-matrix composite. This will further enhance the performance characteristics and capabilities of the button.

The present invention thus provides an induction heating assisted, friction stir welding, self-drilling, multi-material button fastener. However, different materials may require different processing requirements. For example, if using a multi-material fastener to attach carbon fiber to steel, the induction heating may not be required. Moreover, the heat generated by the friction stir welding process may be too much for the carbon fiber and the process may need to be chilled, such as via gas or liquid or a combination thereof, to achieve the selected thermal processing profile.

The present invention thus provides a friction stir welding fastener, wherein a method of using the fastener may include providing a hole in one sheet or element of material, which allows the fastener to be inserted through the hole, whereby the fastener may abut against a surface of the adjacent sheet that is to be joined to the first sheet of material, and the method then includes directly friction stir welding the fastener to the second sheet or element of material. Optionally, the friction stir welding fastener may comprise a self-drilling and/or self-machining fastener, and may comprise multi-materials. In such a multi-material application, the materials may include selected materials, which may naturally heat to a curie temperature that is selected to assist in either the drilling, machining, friction stir welding or adhesive bonding (which assists in the mechanical clamping process).

Optionally, the fastener material selection may be made by the ability of the fastener to machine its way through the top layer, inductively couple into the magnetic field and then friction stir weld itself, and such that after bonding the fastener and joint have little or no corrosion problems.

Thus, the present invention provides a friction stir weld fastener with a head that is engaged via a rotational drive device and spun. The fastener inserts through the first sheet or panel or substrate or element or object and engages the second sheet or panel or substrate or element or object, whereby, as the fastener is spun, friction is generated and the fastener may stir into grooves formed at surface of second sheet. The fastener thus connects to the punch or rotational driving device and spins, which spins against the second sheet or object (such as at grooves established at the surface of the sheet or object that is engaged by the fastener) to create friction and heat, causing welding or a mixing of materials together between the fastener and the material that it is spinning against, fastener to the second sheet or object. The fastener or button thus allows for joining of dissimilar materials via friction stir welding, since it is the fastener that is welding to the second object and not the first object that is welding to the second object. The head of the fastener holds the first object while the welding holds the second object to retain or secure or fasten the two objects together, regardless of the material of at least the first object.

The method and system of the present invention is for joining materials, including dissimilar materials, via a friction stir welded button fastener. The pressure inducing spindle assembly engages the button fastener, which is spun as it engages the materials, whereby the button fastener joins the two or more substrates or elements or materials while being supported underneath by an anvil or the like.

Figure 2:
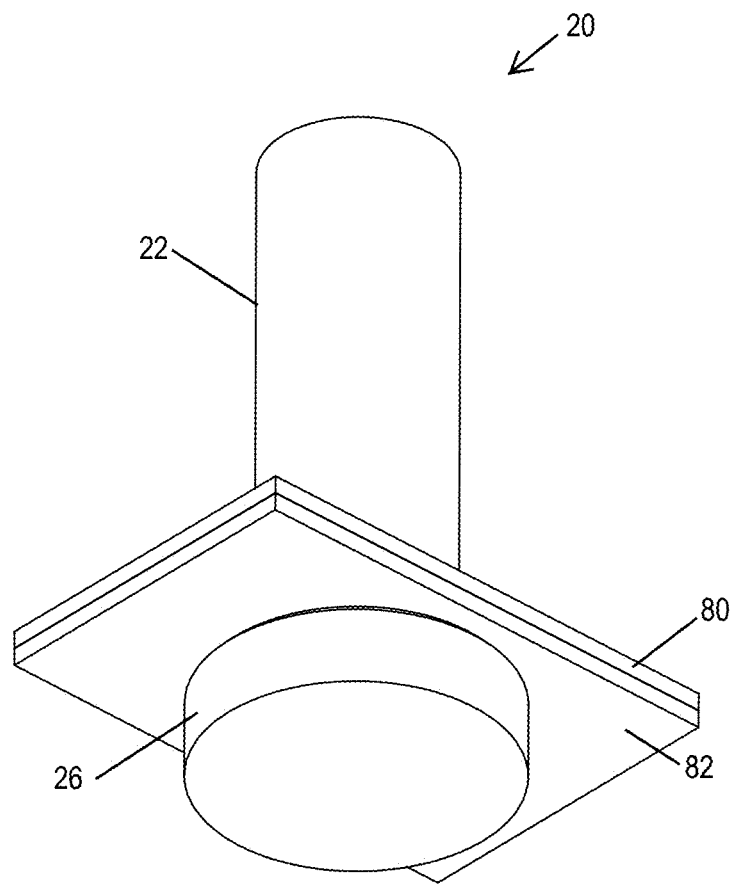
FIG. 2 is a lower perspective view of the friction stir weld apparatus of FIG. 1.
Figure 3:
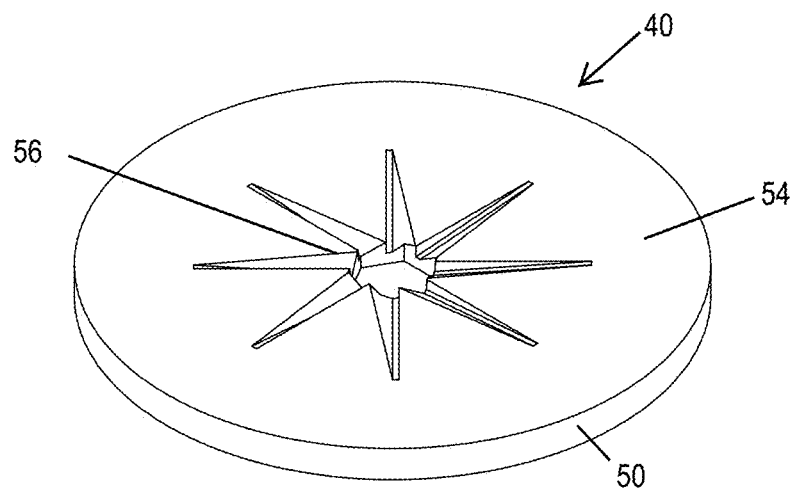
FIG. 3 is an upper perspective view of a friction stir weld fastener in accordance with the present invention.

Referring now to the drawings and the illustrative embodiments depicted therein, a friction stir weld apparatus 20 comprises a rotational driving device or spindle 22 and an anvil or base 26 (FIGS. 1 and 2). Spindle 22 rotates about a central axis 28 and can be lifted and lowered relative to base 26. Base 26 provides vertical support for a top object 80 and bottom object 82 being joined. Releasable attached to the bottom surface of spindle 22 is a button or fastener 40. Spindle 22 transfers vertical pressure and rotational, vibrational, oscillatory and/or other like movement to the engaged fastener 40 so that fastener 40 creates a friction stir weld bond with objects 80 and 82 as part of a friction stir weld process, as discussed in detail below. Fastener 40 welds to one or more of the objects being joined and is left attached, increasing the strength of the joint, as also discussed below.

Optionally, the bonding process can be further augmented or enhanced through the use of an auxiliary heat source, such as induction. For example, a lower induction coil may be added to base 26 and an upper induction coil may be added to spindle 22, such as discussed in detail below. The coils assist the friction stir weld process by supplying induction heating to spindle 22, fastener 40, base 26, and/or one or both objects 80 and 82. The induction heating process may utilize aspects of the processes described in U.S. Pat. No. 8,479,552 and/or U.S. patent application Ser. No. 12/124,347, filed May 21, 2008, and/or Ser. No. 13/111,399, filed May 19, 2011, which are hereby incorporated herein by reference in their entireties. Preheating spindle 22, fastener 40, base 26, and/or one or both objects 80 and 82 reduces the amount of energy input (friction, pressure, torque or other) needed by the friction stir welding process. Induction assisted friction stir welds are also faster and require less clamping force to hold the components in place.

Referring now to FIGS. 3-6, fastener 40 comprises a head portion 50 and a shaft portion 60. Head 50 is generally disc shaped having a top surface 54 and a bottom surface 52. Located near the center of top surface 54 is a star-shaped groove or recess 56 dimensioned to detachably engage with a driver 90 at the bottom of spindle 22. Recess 56 is configured to transfer motion and torque from spindle 22 to fastener 40. Shaft 60 having a bottom surface 70 is generally cylindrical in shape and protrudes downward and substantially perpendicular to bottom surface 52. Bottom surface 52 of the head portion and bottom surface 70 of the shaft portion have one or more concentric circular friction stir weld features or channels 58 defined between concentric ribs 59 that are used to generate the bond between fastener 40 and objects 80 and 82. Head 50, recess 56, shaft 60 and channels 58 are configured to center on rotational axis 28 of spindle 22. As spindle 22 rotates about axis 28, spindle 22 is lowered downward toward base 26 and objects 80 and 82. Spindle 22 transfers vertical pressure and rotational movement to the engaged fastener 40 so that, as the fastener is rotatably engaged with the object, the ribs 59 cut or melt or stir into objects 80 and 82 and frictional heat is generated between fastener 40 and objects 80 and 82, thereby causing a softening and mixing of the materials of objects 80 and 82 in the material mixing zone 96. At the completion of the weld process, ribs 59 on head 50 and shaft 60 are embedded or fused in objects 80 and 82, respectively.

Figure 4:
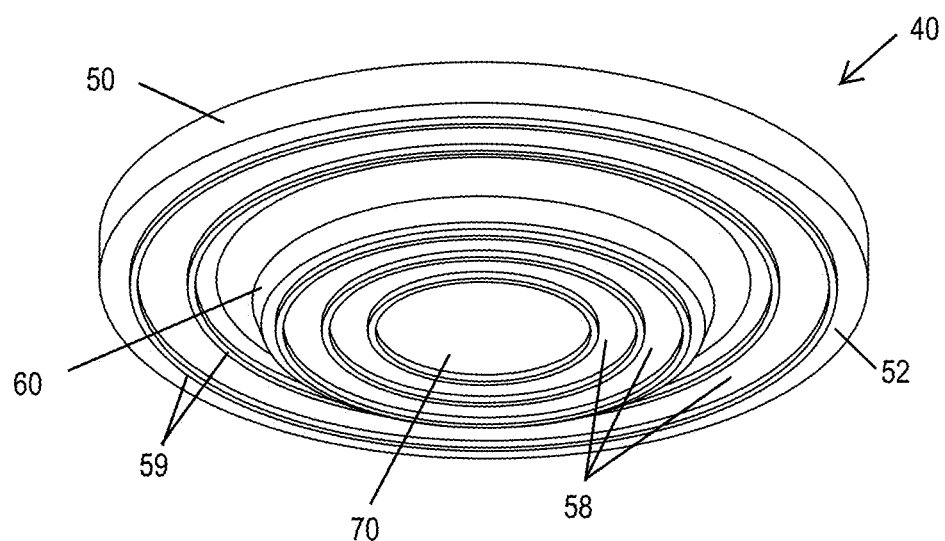
FIG. 4 is a lower perspective view of the friction stir weld fastener of FIG. 3, shown with concentric circular ribs.
Figure 4A:
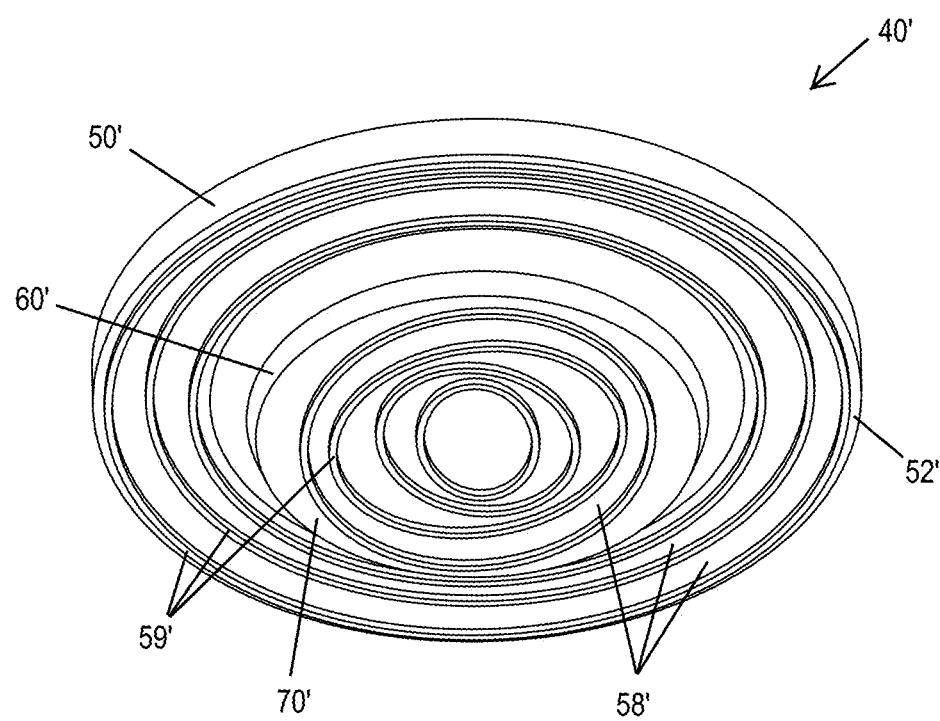
FIG. 4A is a lower perspective view of a friction stir weld fastener having nonconcentric and/or noncircular ribs.
Figure 5:
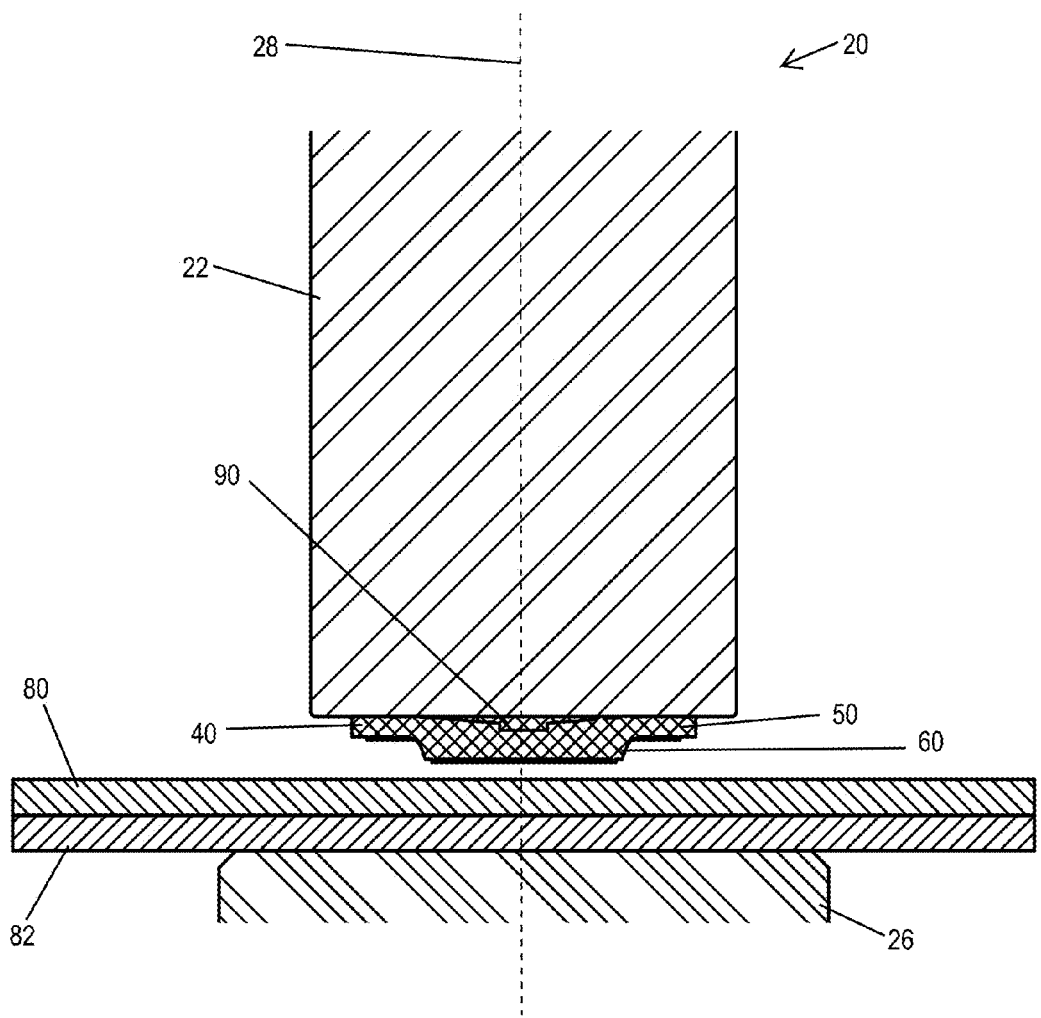
FIG. 5 is a sectional view of the friction stir weld apparatus of FIG. 1.
Figure 6:
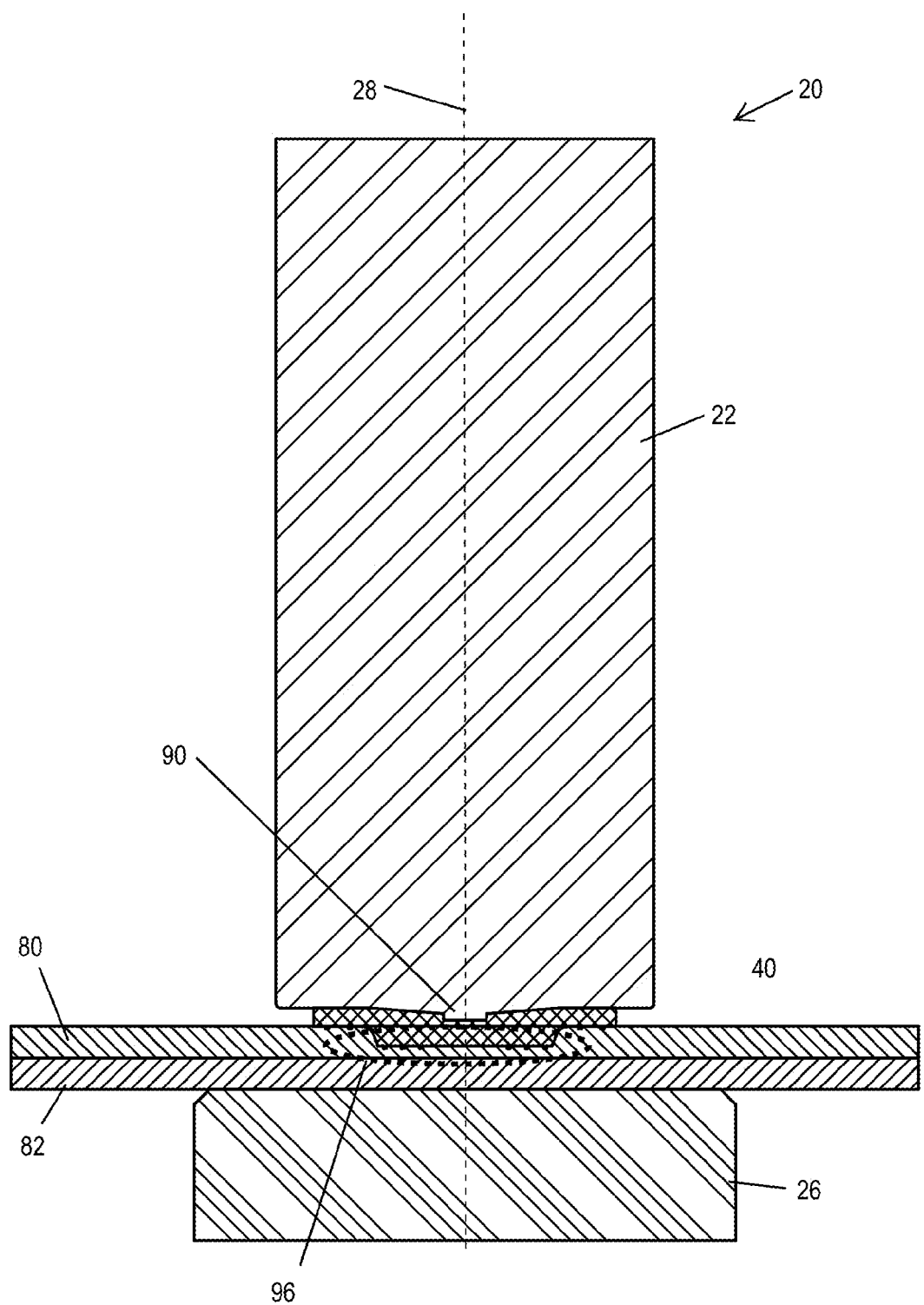
FIG. 6 is a sectional view of the friction stir weld apparatus of FIG. 1 shown during the friction stir weld process.

Optionally, a fastener may have one or more ribs that are nonconcentric and/or noncircular. For example, and as shown in FIG. 4A, a detachable fastener 40' comprises a head 50' and a shaft 60' similar to fastener 40 above. Head 50' has a lower or bottom surface 52', and shaft 60' has a lower or bottom surface 70'. Lower surface 52' of the head portion and lower surface 70' of the shaft portion have one or more nonconcentric and/or noncircular channels 58' defined between nonconcentric and/or noncircular ribs 59'. Ribs 59' mix the softened materials during the friction stir weld process, such as in a similar manner as described above. Optionally, some of the ribs may be generally or substantially circular and some may be non-circular, depending on the particular application and desired configuration of the ribs of the fastener.

Figure 8:
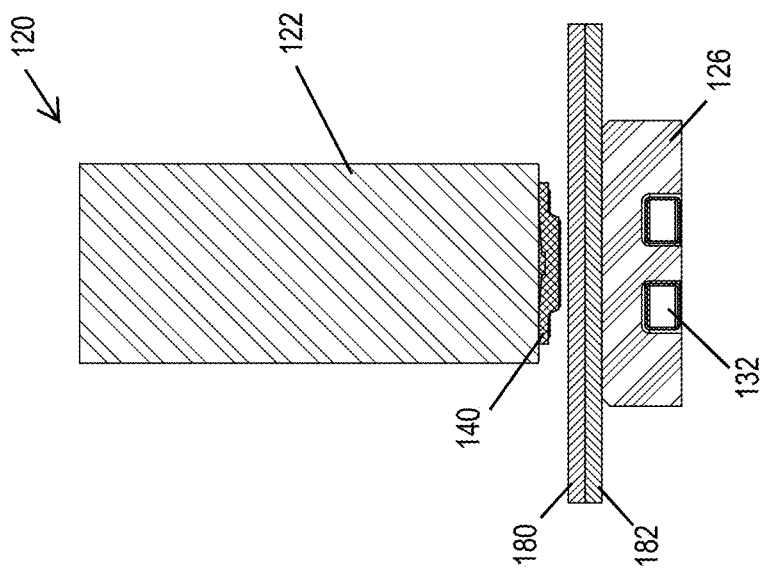
FIG. 8 is a sectional view of the friction stir weld apparatus of FIG. 7.
Figure 7:
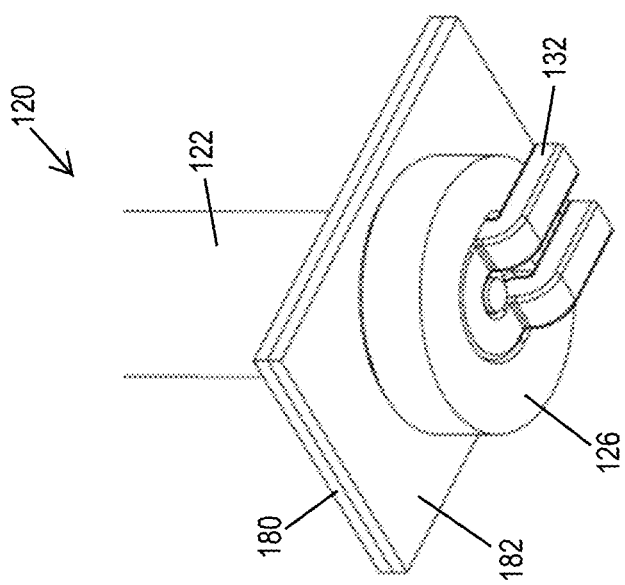
FIG. 7 is a lower perspective view of a friction stir weld apparatus of the present invention incorporating a lower induction heating coil.

As mentioned above, the friction stir weld process may be enhanced or augmented through the use of an auxiliary heat source, such as induction heating. FIGS. 7 and 8 show a friction stir weld apparatus 120 similar to weld apparatus 20 above except with a lower induction coil 132 added into a base 126. Alternating current through coil 132 can be used to create heat in spindle 122, fastener 140, base 126, and/or one or both objects 180 and 182 through electromagnetic induction. The frequency of the current is based on, among other things, the object size and material composition. Friction stir weld apparatus 120 may otherwise be substantially similar to apparatus 20, discussed above, such that a detailed discussion of the apparatuses need not be repeated herein. Similar components are shown with similar reference numbers, with 100 added to the elements of FIGS. 7 and 8.

Figure 9:
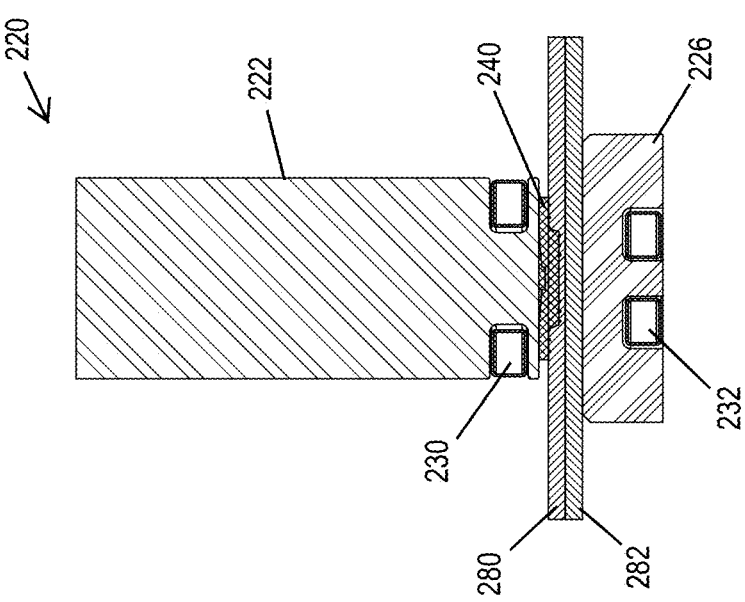
FIG. 9 is a sectional view of a friction stir weld apparatus of the present invention incorporating both an upper and a lower induction heating coil.

Optionally, a friction stir weld apparatus 220 may comprise an upper induction coil 230 positioned around a spindle 222 and a lower induction coil 232 added into a base 226 (FIG. 9). Upper coil 230 and lower coil 232 need not necessarily operate at the same frequency, allowing different heating profiles. Upper coil 230 and lower coil 232 operate at frequencies required to heat any combination of a bottom object 282, a top object 280, and/or a button fastener 240 to at least partially assist in the joining process. For example, the frequency of the alternating current through upper coil 230 may be chosen based on the material of top object 280 or fastener 240 and the frequency of the current through lower coil 232 may be chosen based on the material of bottom object 282 or base 226. Friction stir weld apparatus 220 may otherwise be substantially similar to apparatus 120, discussed above, such that a detailed discussion of the apparatuses need not be repeated herein. Similar components are shown with similar reference numbers, with 100 added to the elements of FIG. 9.

Figure 10:
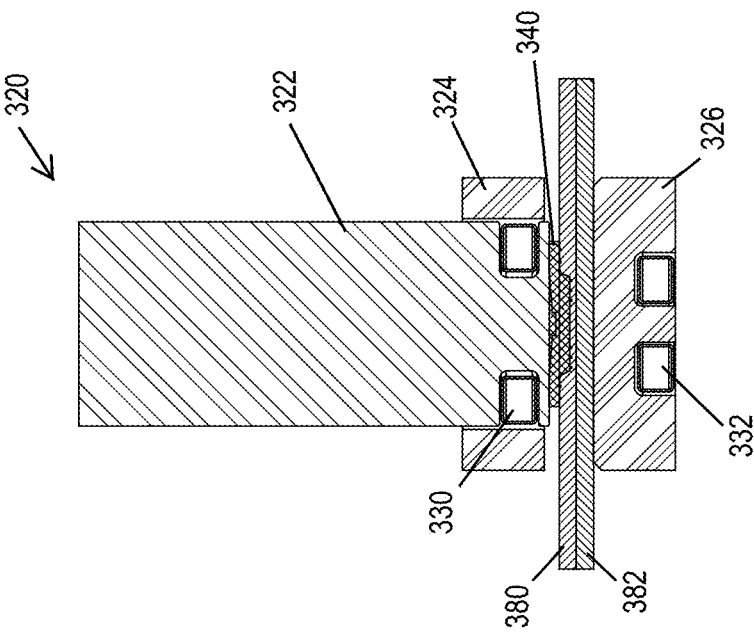
FIG. 10 is a sectional view of a friction stir weld apparatus of the present invention incorporating an upper and a lower induction heating coil with a flux concentrator around the upper coil.

Optionally, a friction stir weld apparatus 320 may comprise a flux concentrator 324 around an upper induction coil 330 (FIG. 10). Flux concentrator 324 helps shape or focus the induction field. Friction stir weld apparatus 320 may otherwise be substantially similar to apparatus 220, discussed above, such that a detailed discussion of the apparatuses need not be repeated herein. Similar components are shown with similar reference numbers, with 100 added to the elements of FIG. 10.

When induction heating is used, the magnetic field generated can be used to target specific components based upon the selection of the individual materials of the spindle, fastener, base, or objects to be joined. In addition, the spindle, fastener or base can be comprised of multiple materials such as magnetic and nonmagnetic materials. These materials can be selected based upon their individual curie temperatures so that the selected materials heat to a predetermined temperature, and thus become self-regulating in nature. The heat that is generated at least partially assists with the bonding process. The heat source does not need to be limited to induction. Optionally, electrical resistive heating, radiant, laser or even heat energy generated by the burning of fossil fuels can be used as the heat source, and the heat energy can be transmitted to the work area via conduction. In addition, the heat energy could be produced outside the work cell and transmitted to the work cell via a liquid or gas.

Optionally, a heat sink may be incorporated into the friction stir weld process to remove process heat during the friction stir process or after the welding or bonding has taken place. For example, the removal of heat after processing could assist in the re-crystallization of materials being joined or to speed up the process cycle or both.

Figure 11:
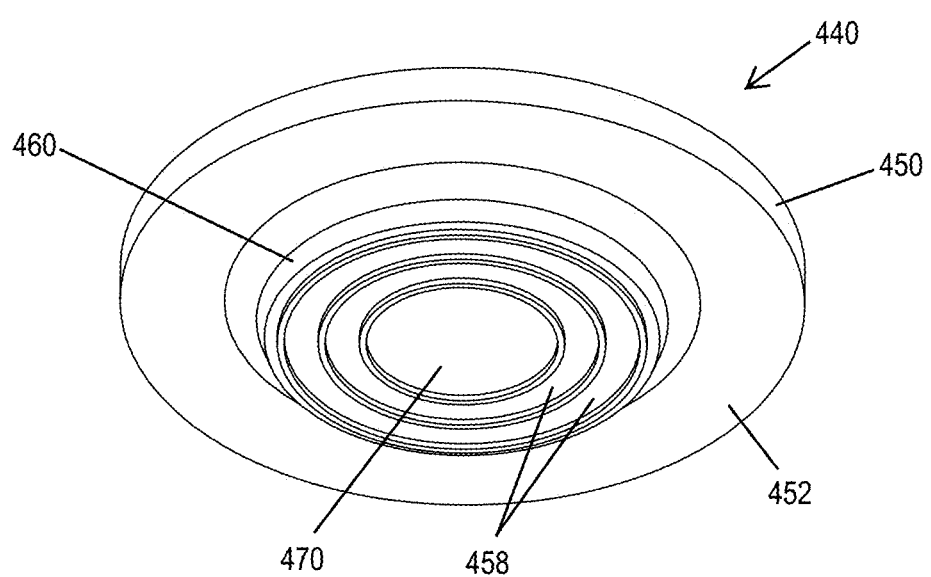
FIG. 11 is a lower perspective view of another friction stir weld fastener in accordance with the present invention where only a shaft portion has friction stir weld channels.
Figure 12:
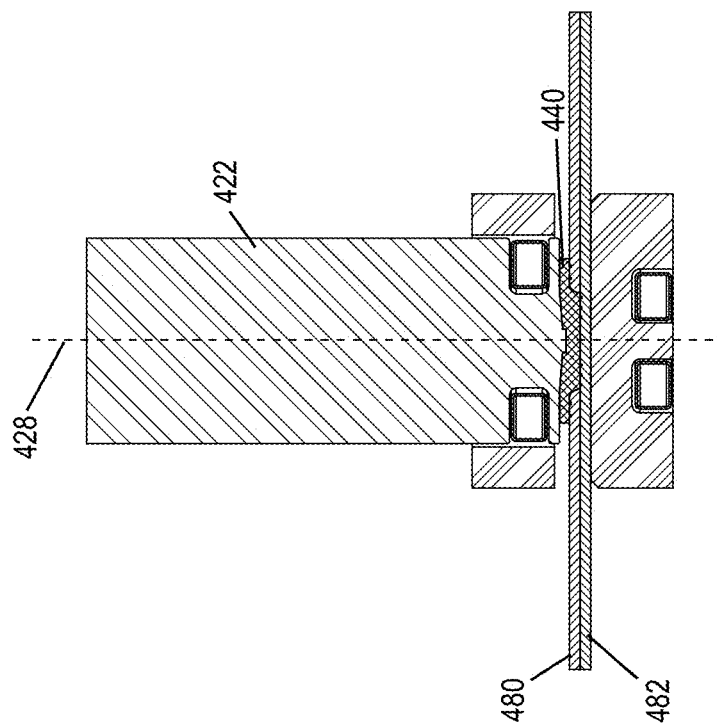
FIG. 12 is a sectional view of a friction stir weld apparatus of the present invention, shown with a top object having a hole for inserting a fastener through prior to starting a friction stir weld process.
Figure 13:
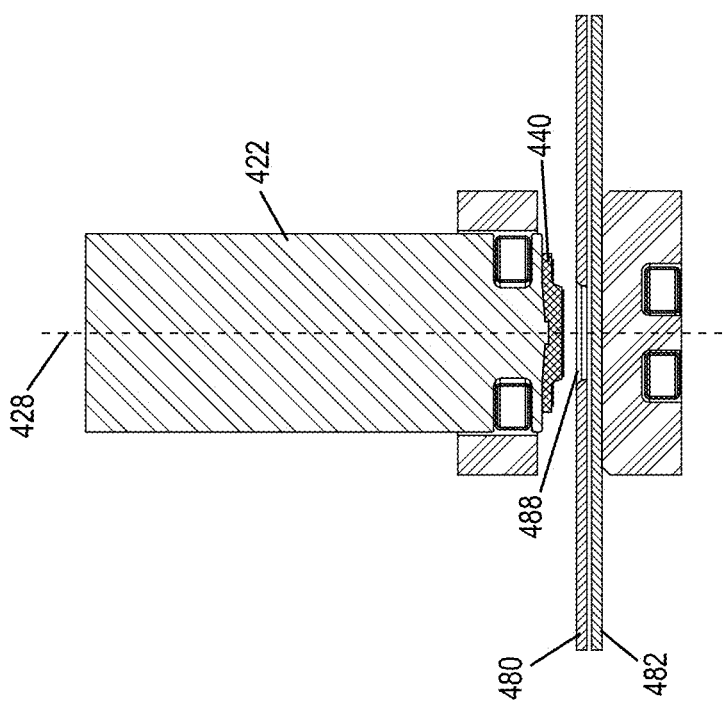
FIG. 13 is a sectional view of the friction stir weld apparatus of FIG. 12, shown during the friction stir weld process.
Figure 14:
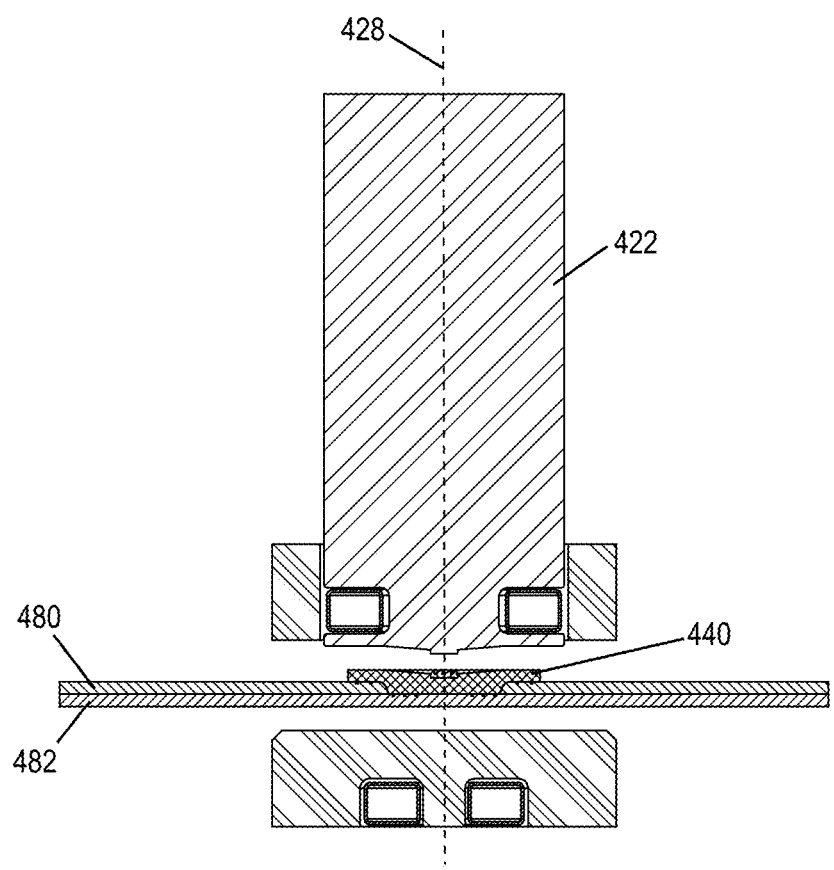
FIG. 14 is a sectional view of the friction stir weld apparatus of FIG. 12, shown with the top object joined to a bottom object.

Fastener 40 is configured to friction weld to both top object 80 and bottom object 82. Optionally, a fastener can be configured to friction stir weld to one object while securing the other object via downward pressure or friction stir weld to one object creating a pivot or pinned joint between the objects. As shown in FIG. 11, a fastener 440 comprises a head 450 and a shaft 460 similar to fastener 40 discussed above, such that a detailed discussion of the fastener need not be repeated herein. Shaft 460 has a bottom surface 470 with one or more friction stir weld features or channels 458. Head 450 has a bottom surface 452 that, unlike fastener 40, is generally flat with no friction stir weld features. Fastener 440 is particularly useful when at least one of the materials to be joined is not easily friction stir welded, such as when joining carbon fiber composites to metal. As shown in FIGS. 12-14, fastener 440 engages a spindle 422 in the same manner as described above. A top object 480 having a through hole 488 to a bottom object 482 is aligned under fastener 440 so that shaft 460 inserts through hole 488. During the joining process, shaft 460 friction stir welds to bottom object 482, bonding fastener 440 to bottom object 482, whereas top object 480 remains secured to bottom object 482 via downward pressure from head 450.

Figure 15:
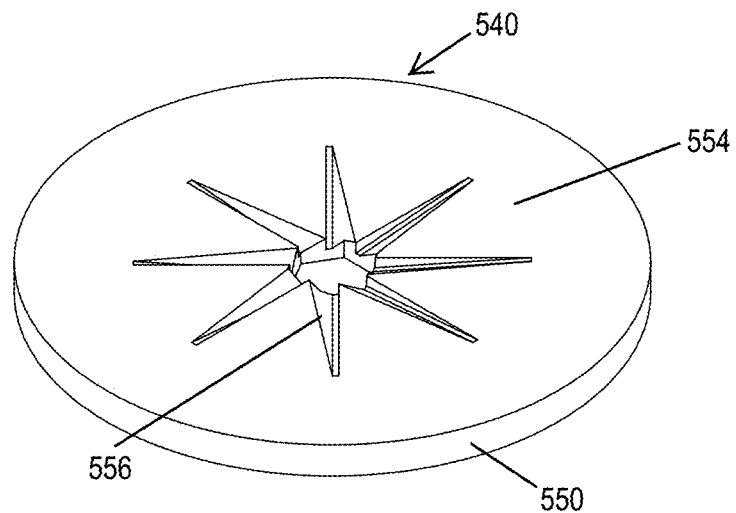
FIG. 15 is an upper perspective view of a self-drilling friction stir weld fastener of the present invention.
Figure 16:
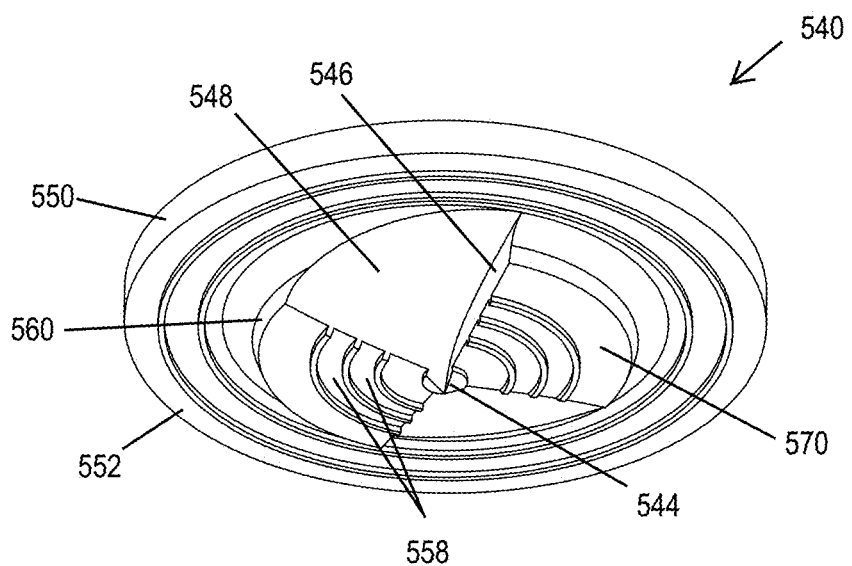
FIG. 16 is a lower perspective view of the self-drilling friction stir weld fastener of FIG. 15.
Figure 18:
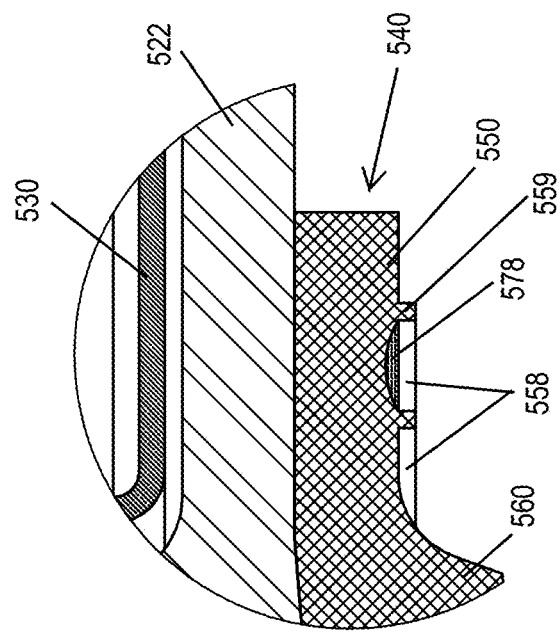
FIG. 18 is an enlarged view of a detail taken at the circular line A of FIG. 17.

Optionally, a fastener of the present invention may include a self-drilling or self-machining feature configured to drill or machine its own hole through the one or more objects to be joined. This eliminates the separate step of pre-drilling a hole before the friction stir weld process. FIGS. 15 and 16 show a detachable fastener 540 having a self-drilling and milling feature. Fastener 540 comprises a head portion 550 and a shaft portion 560. Head 550 has a top surface 554 and a bottom surface 552. Top surface 554 includes a recess 556 having the same shape and function as recess 56 discussed above. Shaft 560 extends downward and substantially perpendicular to bottom surface 552. Shaft 560 is configured to drill and machine a hole through one or more of the objects to be joined and includes a drill tip 544, a machining or cutting face 546, and a flute 548. Shaft 560 also includes a friction weld surface 570 that, along with bottom surface 552, include a plurality of concentric circular and semicircular channels 558 defined between concentric ribs 559, which serve as a collection reservoir for softened material during the friction stir weld process (optionally, one or more of the ribs and channels may be nonconcentric and/or noncircular, such as in a similar manner as described above with respect to FIG. 4A). With these features, fastener 540 is capable of machining through one or more upper objects while simultaneously friction stir welding to both the upper and lower objects. This enables fastener 540 to join two or more work pieces without requiring a predrilled hole in the upper materials.

Figure 17:
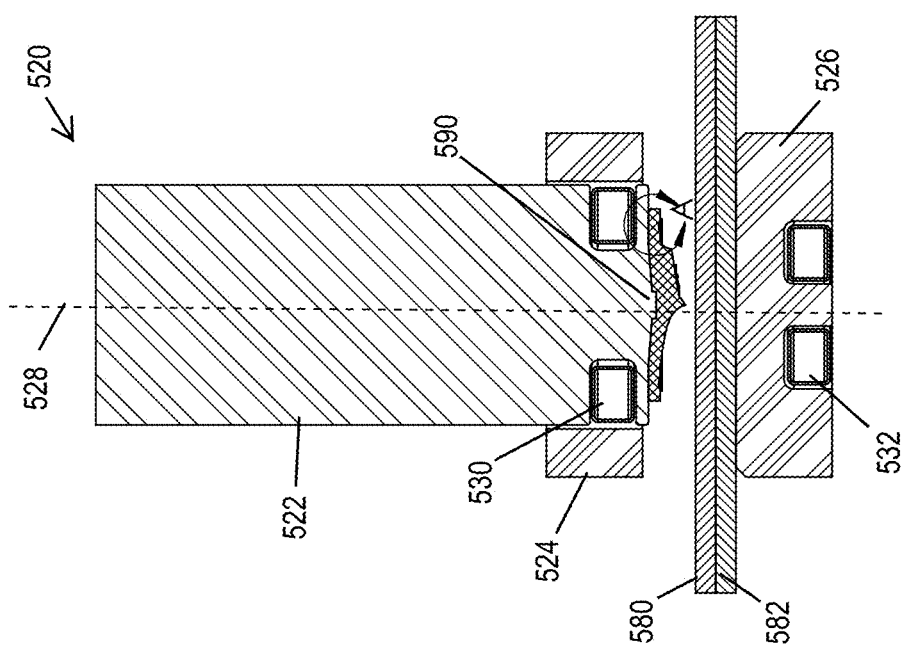
FIG. 17 is a sectional view of a friction stir welding apparatus of the present invention incorporating the fastener of FIG. 15.

FIG. 17 shows a friction stir weld apparatus 520 employing fastener 540. Fastener 540 detachably engages with a driver 590 located at the bottom of a spindle 522. As spindle 522 and attached fastener 540 rotate about an axis 528, machining face 546 cuts away at a top object 580. Flute 548 helps to remove material cut away by the drilling or machining process. When drill tip 544 reaches a bottom object 582, the rotational and/or downward force supplied by spindle 522 is used to provide the torque required to friction stir weld fastener 540 to at least bottom object 582. A lower induction coil 532 and/or upper induction coil 530 and flux concentrator 524 may be used to assist in the drilling and friction stir welding process by at least partially heating base 526, spindle 522, fastener 540, and/or objects 580 and 582 as described above. Alternatively, induction coils 530 and/or 532 may be replaced with a water line or other heat sinking mechanism (not shown) to help remove heat from fastener 540, objects 580 and 582, and/or the friction welding equipment. When fastener 540 is used to bond carbon fiber composite material to metal, the fatigue life is significantly higher than conventional rivet joints commonly used in such applications. Additionally, unlike conventional rivets, galvanic corrosion is not a concern because fastener 540 could be made from the same material (or a material alloy that is selected to not induce corrosion) as the metal of bottom object 582. Optionally, fastener 540 may include a heat activated adhesive 578 to better bond with top object 580. A more detailed discussion of the use of heat activated adhesives is discussed below.

The friction stir weld process is capable of joining many dissimilar materials; however, some alloys just do not mix. In that case, the fastener can be manufactured from a bridging alloy capable of welding to each of the objects to be joined. In this way, the materials do not have to weld to each other. Rather each of the materials weld to the fastener and the fastener links the components together.

Figure 19:
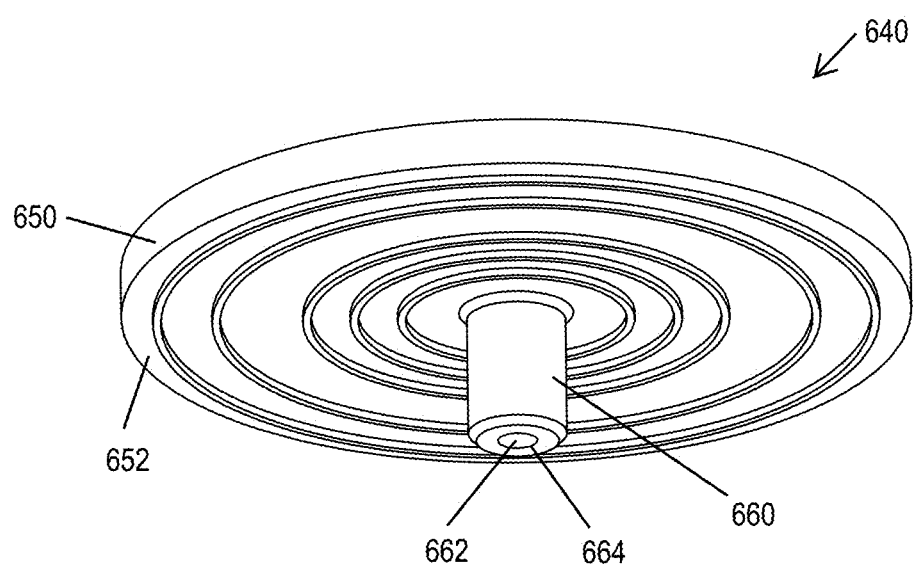
FIG. 19 is a lower perspective view of another friction stir weld fastener of the present invention having a rivet forming shaft.
Figure 20:
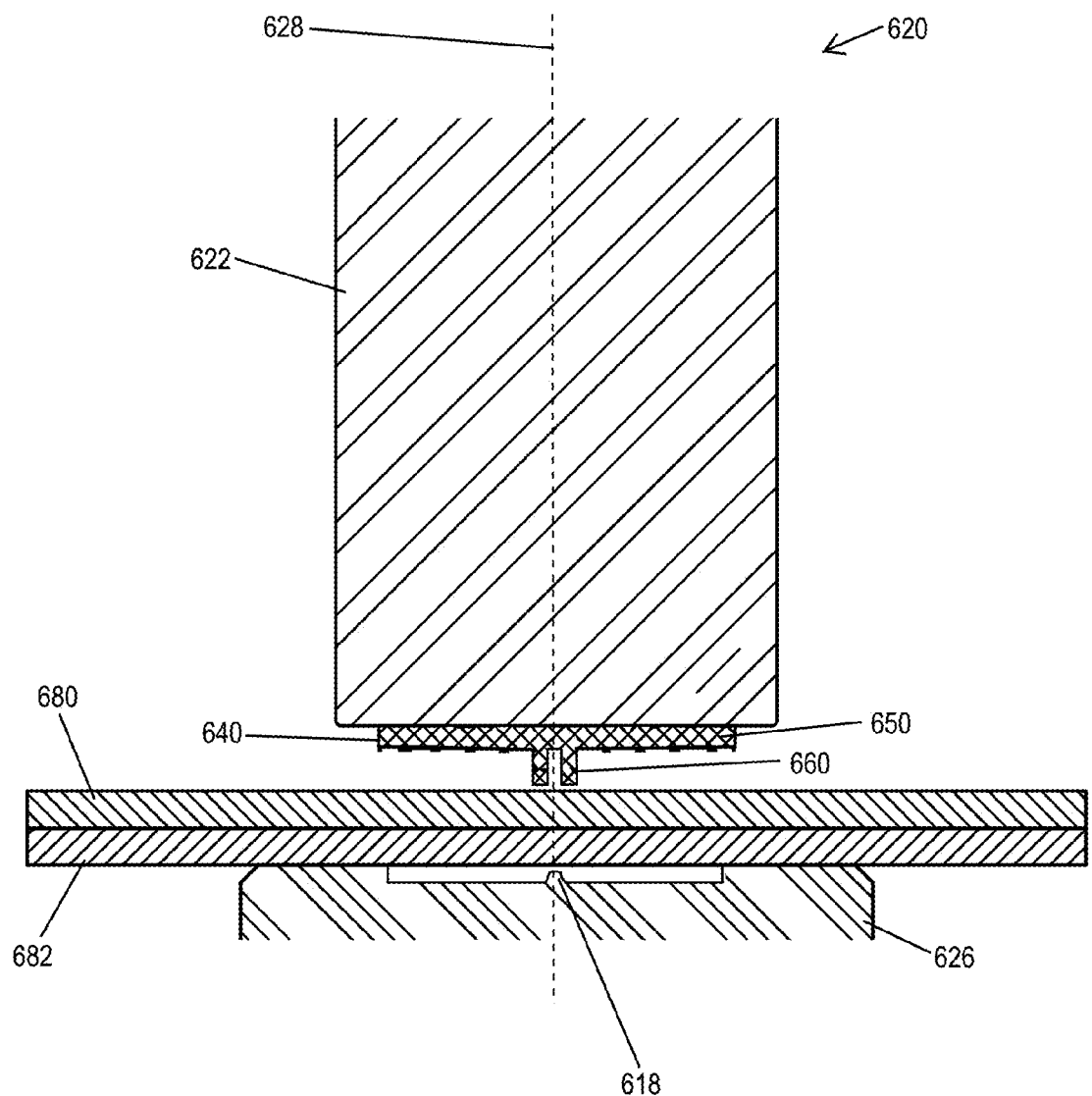
FIG. 20 is a sectional view of a friction stir weld apparatus of the present invention incorporating the fastener of FIG. 19.
Figure 21:
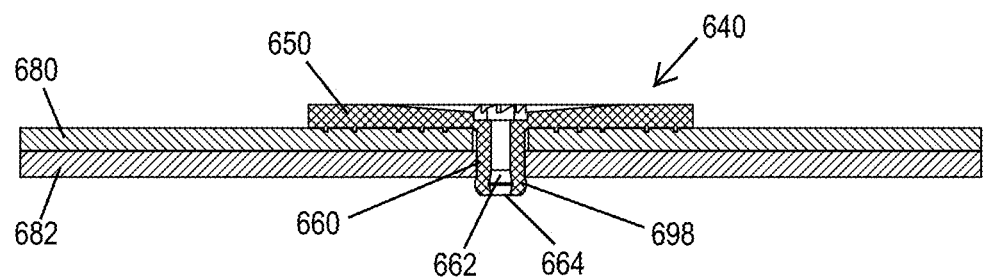
FIG. 21 is a sectional view showing the rivet forming fastener of FIG. 19 joining a top and a bottom object.
Figure 22:
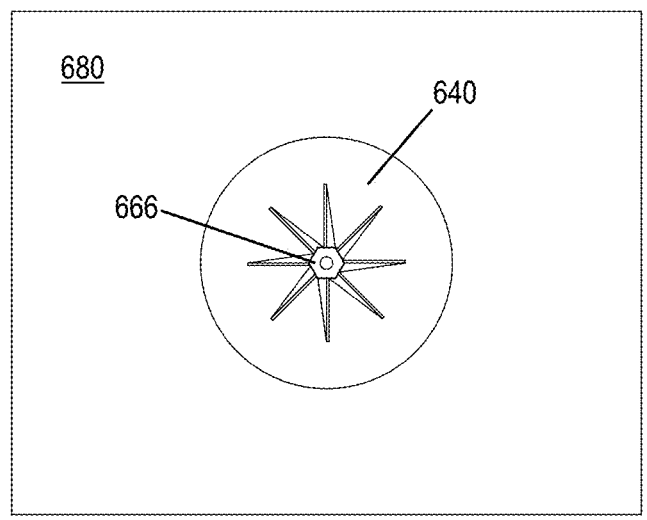
FIG. 22 is a plan view showing the fastener of FIG. 19 with a through-hole bolt attachment.

Optionally, a hybrid fastener 640 may combine friction stir welding features and riveting features as shown in FIG. 19. Fastener 640 comprises having a head 650 similar to head 50 described above and a shaft 660. Shaft 660 extends downward from a bottom surface 652 of head 650 and has an inner cavity 662 with an opening 664 located at its bottom or distal end. Head 650 friction stir welds to a top object 680. Shaft 660 is configured to protrude through both top object 680 and a bottom object 682. Shaft 660 may drill through objects 680 and 682, pierce through objects 680 and 682, or push through a hole that has already been provided in objects 680 and 682. The friction stir weld process is performed in the same manner as described above by rotating a spindle 622 with attached fastener 640 about an axis 628. However, as shaft 660 protrudes through bottom object 682, a protrusion or pin 618 in a base 626 enters opening 664 upsetting at least a portion of the bottom end of shaft 660, forming a rivet 698, which creates a mechanical interference between shaft 660 and bottom object 682.

Figure 23:
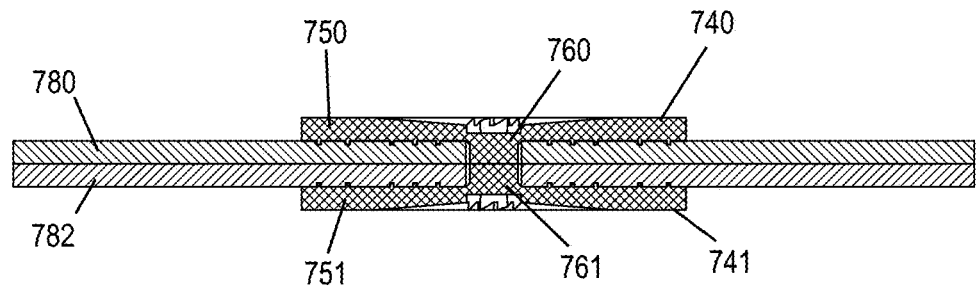
FIG. 23 is a sectional view of two friction stir weld fasteners bonded together to join a top and a bottom object.

Optionally, inner cavity 662 may be a hole passing through the middle of fastener 640. The hole can provide an access point for additional fasteners such as a self-drilling or tapping screw 666, clips, pins, or the like Optionally, the button fastener may also be configured as a dual hybrid fastener wherein friction stir welding is performed between a fastener and a backer or between two fasteners as shown in FIG. 23. A top fastener 740 and a bottom fastener 741 each comprise a head 750 and 751, respectively, and a shaft 760 and 761, respectively. Head 750 friction stir welds to a top object 780, and head 751 friction stir welds to a bottom object 782. The bond between fasteners 740 and 741 may be a friction stir weld or mechanical joint where fastener shafts 760 and 761 meet. Optionally, fasteners 740 and 741 may bond by a mechanical joint. This dual hybrid fastener configuration is particularly useful for providing extra support in thin walled components where a solid surface is needed for the attachment.

Figure 24:
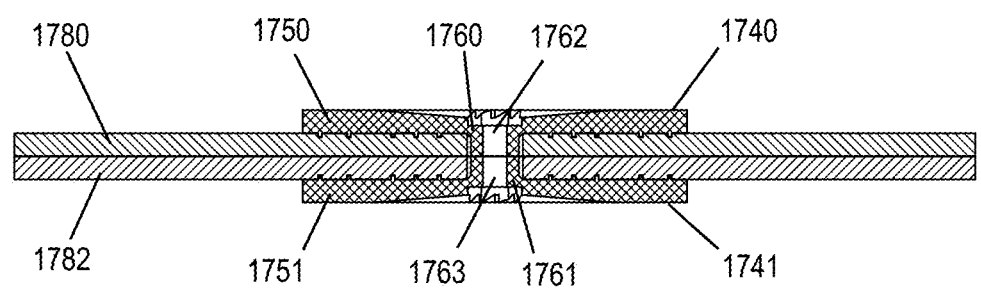
FIG. 24 is a sectional view of two friction stir weld fasteners bonded together to join a top and a bottom object, wherein the welded fasteners have a hole passing through the middle.
Figure 25:
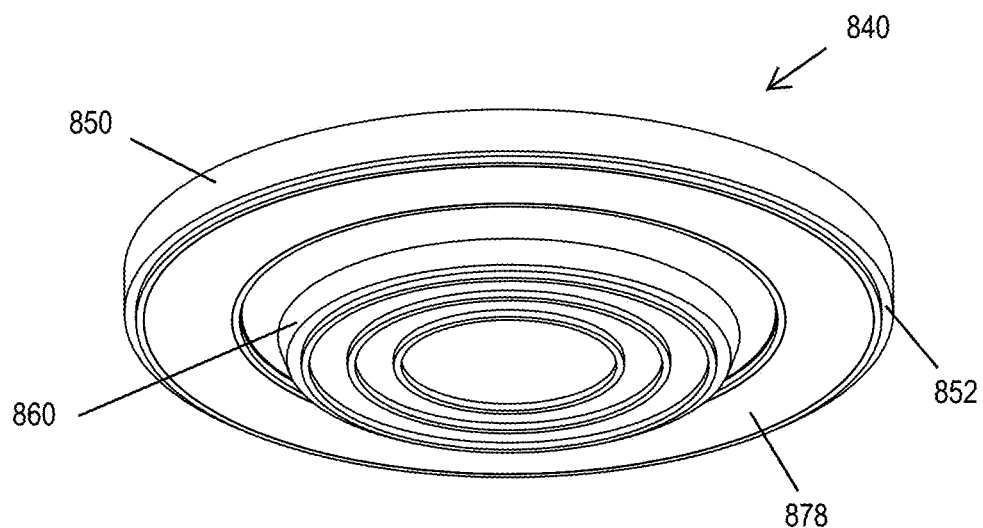
FIG. 25 is a lower perspective view of a friction stir weld fastener including an adhesive ring.
Figure 26:
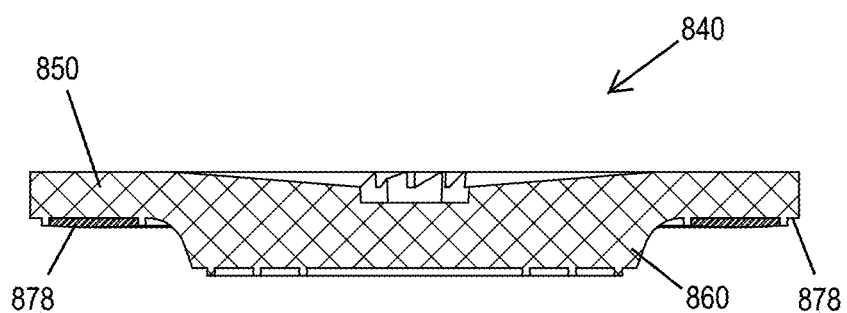
FIG. 26 is a sectional view of the fastener of FIG. 25.

Optionally, the dual hybrid fastener may incorporate a through hole that can be used as an access point for additional fasteners such as self-drilling or tapping screws, clips, pins or the like. As illustrated in FIG. 24, a top fastener 1740 and a bottom fastener 1741, similar to dual hybrid fasteners 740 and 741 above, comprise a head 1750 and 1751, respectively, and a shaft 1760 and 1761, respectively. Head 1750 friction stir welds to a top object 1780, and head 1751 friction stir welds to a bottom object 1782. Fasteners 1740 and 1741 bond to each other at shafts 1760 and 1761. Shafts 1760 and 1761 have a hole 1762 and 1763, respectively, passing through the middle of each. When fasteners 1740 and 1741 are joined, holes 1762 and 1763 together create a through hole between objects 1780 and 1782.

Optionally, any of the fasteners described herein may also include a heat activated, expanding, or other adhesive. The adhesive, which can be applied to the fastener as a pre-made adhesive ring or applied using pumpable adhesive application processes, provides another method of bonding the fastener to the upper objects being joined. In addition, the adhesive can act as a seal to keep outside elements, such as debris and moisture, from the joint or bond area. When joining carbon fiber materials to steel materials using, for example, self-machining fastener 540, the adhesive can act as an insulator by isolating the broken carbon fibers produced by the milling process from the steel material, thus reducing the galvanic or corrosion tendency that these two materials have towards each other. A fastener 840 having the same general configuration as fastener 40 described in detail above includes a head 850 with a bottom surface 852 and a shaft 860. A strip of heat activated adhesive 878 is applied on a region of bottom surface 852 of head 850 intended to engage the top of an object being joined. As fastener 840 heats during the friction stir weld or secondary process, adhesive 878 melts bonding bottom surface 852 to the uppermost object while shaft 860 friction stir welds to at least a bottom object. The purpose of adhesive 878 is to reduce fatigue by limiting the movement of the object to which it is adhered through fortifying the end constraints and limiting torsion. Utilizing a fastener with adhesive creates a better bond to plastics and composites.

Figure 27:
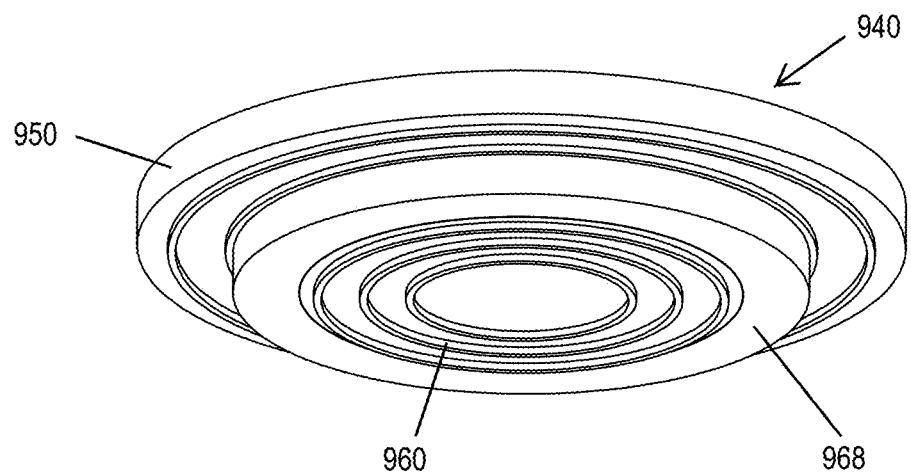
FIG. 27 is a lower perspective view of a friction stir weld fastener including a sealing strip.
Figure 28:
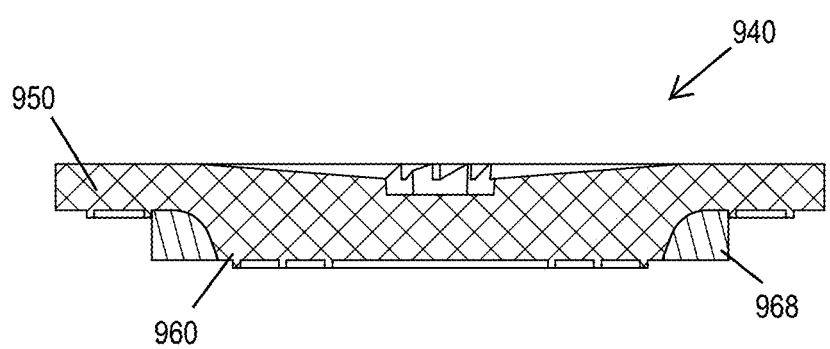
FIG. 28 is a sectional view of the fastener of FIG. 27.

Optionally, any of the fasteners described herein may include a bonding or sealing material. As illustrated in FIGS. 27 and 28, a fastener 940 having the same configuration as fastener 40 above with a head 950 and a shaft 960 further includes a sealing strip 968. During the friction stir weld process, sealing strip 968 forms a barrier between fastener 940 and the objects being joined. Sealing strip 968 also fills any gaps between the objects and the fastener, forming a seal and reducing movement around the fastener. In FIGS. 27 and 28, sealing strip 918 is applied around the perimeter of shaft 960. Optionally, sealing strip 968 may be used in a manner similar to adhesive strip 870 discussed above. The sealing material can be any number of materials based on the application including foam, elastomer, polymer or the like.

Figure 29:
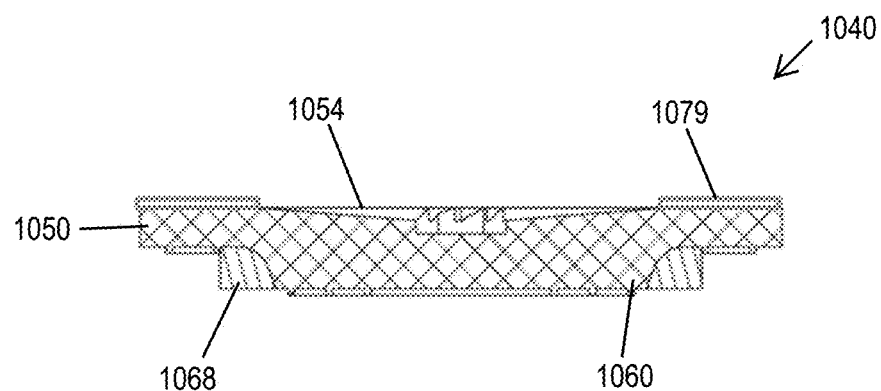
FIG. 29 is a sectional view of a friction stir weld fastener including a ring of heating material.

Optionally, any of the fasteners described herein may include a heating material that couples into the induction field. As illustrated in FIG. 29, a fastener 1040 having the same shape and configuration as fastener 940 above includes a head portion 1050 with a top surface 1054 and a shaft portion 1060. Around the perimeter of shaft 1060 is an optional sealing strip 1068. Around the perimeter of top surface 1054 is a ring of heating material 1079. Heating material 1079 is selected because of its natural inductive heating curie temperature. When inductive heating is used to heat the fastener as described above, the magnetic flux will naturally couple into heating material 1079, causing it to heat its natural curie temperature, become nonmagnetic, and thus self-regulate to that temperature. In the case where a fastener further incorporates a heat activated adhesive or a sealing strip, heating material 1079 may be used to heat the adhesive or sealing material before, during, or after the joining process.

Figure 30:
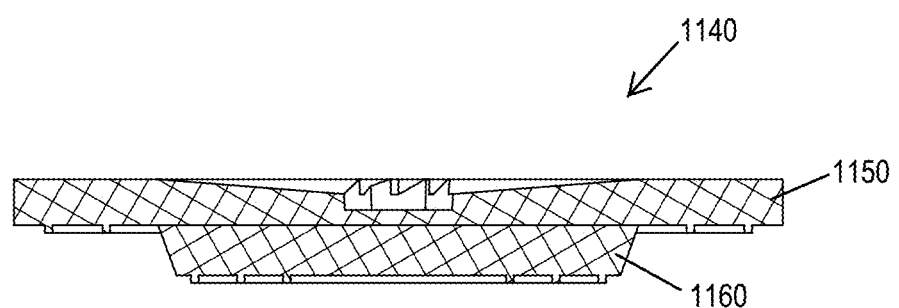
FIG. 30 is a sectional view of a fastener in which a head portion and a shaft portion are made from two distinct materials.

Optionally, each of the fasteners described herein may be made from multiple materials. For example, and such as shown in FIG. 30, a fastener 1140 has a head 1150 and shaft 1160, similar to fastener 40 described above. However, head 1150 is made from one material and shaft 1160 is made from another. The different materials allow for greater friction stir weld flexibility and joined material options. Fastener 1140 can be used to weld dissimilar metals that otherwise could not be welded. For example, if aluminum and magnesium were to be joined through the use of one button fastener and a friction stir weld was to be performed simultaneously on both materials, it may be advantageous for the button fastener to have two unique friction stir welding materials. Optionally, a portion of the fastener could be made from a material selected because of its magnetic curie temperature to at least partially provide heat at a self-regulated temperature during the friction stir weld process, the adhesive bonding process and/or the sealing process while another portion of the faster could be designed for optimal friction stir weld properties. One skilled in the art will recognize the various ways multiple materials could be used to further enhance the performance characteristics and capabilities of the fastener. The multi-material configuration could be created via the use of additive manufacturing techniques, by bonding sheets of material and then stamping fasteners from those blanks, or by traditional cold heading techniques or the like.

Figure 31:
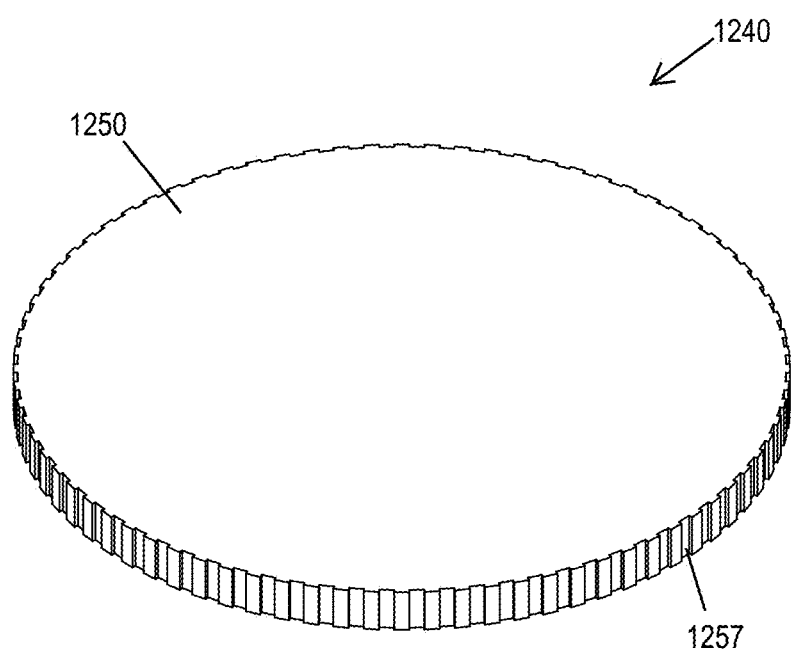
FIG. 31 is a top view showing a friction stir weld fastener having a plurality of peripheral grooves.

In each of the above fasteners, the recess or groove on the top surface of the fastener head is shown in a star-shaped configuration. This configuration allows for easy engagement of the fastener by a rotating spindle. The configuration also supports the torque requirements of the friction stir weld process. However, it is envisioned that the fastener recess and mating driver may be any number of configurations capable of engaging with the rotating spindle and supporting the torque requirements of the friction stir weld process. Optionally, and such as shown in FIG. 31, a fastener 1240 has a head portion 1250 with a plurality of external grooves 1257 positioned around its perimeter. Optionally, a combination of internal and external grooves may also be used.

Optionally, the friction stir weld apparatus may join two or more objects together by vibrating and/or oscillating, rather than rotating, the weld tool or fastener, such as via a driving device or spindle or the like.

Optionally, a disposable or self-destructing friction stir weld head or spindle may be used with any of the friction stir weld fasteners described above wherein the friction stir weld head detaches from the friction stir weld apparatus to reduce heat build-up and/or to provide a failure point to prevent further damage to the friction stir weld apparatus in the event of an obstruction or resistance to movement during the friction stir weld process.

Figure 32:
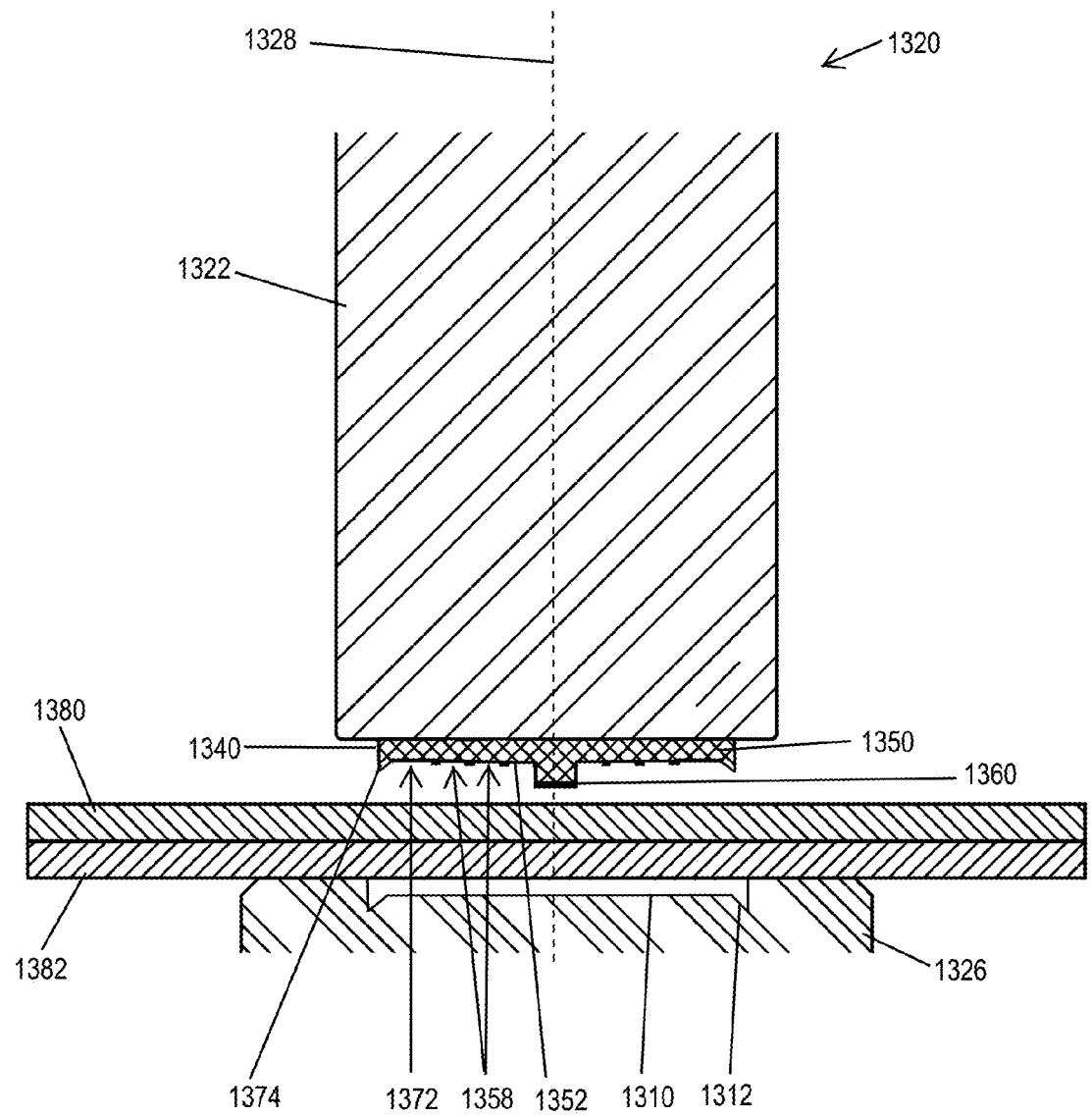
FIG. 32 is a sectional view of a friction stir weld apparatus incorporating a clinch forming weld tool.
Figure 33:
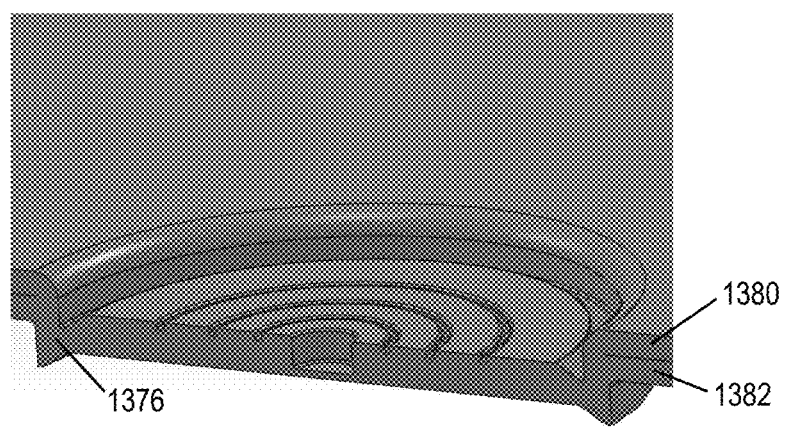
FIG. 33 is a sectional view of a clinch friction stir weld formed by the apparatus of FIG. 32.

In accordance with another aspect of the present invention, a friction stir weld apparatus 1320 (FIG. 32), similar in most respects to the friction stir weld apparatuses discussed above, comprising a spindle 1322 and a base 1326. Machined into the bottom of spindle 1322 is a weld tool 1340 comprising a head portion 1350 and a shaft portion 1360. Head 1350 is generally disc shaped with a bottom surface 1352 having one or more concentric channels 1358. Extending downward and substantially perpendicular to bottom surface 1352 is shaft 1360. Head 1350, shaft 1360 and channels 1358 are centered on a rotational axis 1328 of spindle 1322. The periphery of outer most channel 1372 is at an angle 1374. A top object 1380 and a bottom object 1382 are positioned on base 1326 below spindle 1322. Base 1326 has a generally flat, circular recess 1310 machined into its top surface. Circular recess 1310 is centered on axis 1328 with an angled groove 1312 around its perimeter. Recess 1310 is dimensioned to receive tool 1340 and objects 1380 and 1382, forming a clinch 1376. The friction stir weld process is accomplished in substantially the same manner as discussed above such that a description of that process need not be repeated herein. Optionally, induction or other heating may be used to preheat spindle 1322, weld tool 1340, base 1326 and/or one or both objects 1380 and 1382, or provide heat during the joining process. FIG. 33 shows the resulting friction stir weld clinch 1376 joining objects 1380 and 1382.

Clinching the friction stir weld ensures good material mixing and reduces stress concentrations. Clinching also ensures that the mixing takes place in a specific, localized zone. It is a controllable process and the weld becomes offset, which changes the way loads are applied. For example, an axial force changes to a bending moment. This reduces the stress concentrations in the area around the weld and increases fatigue life.

Figure 34:
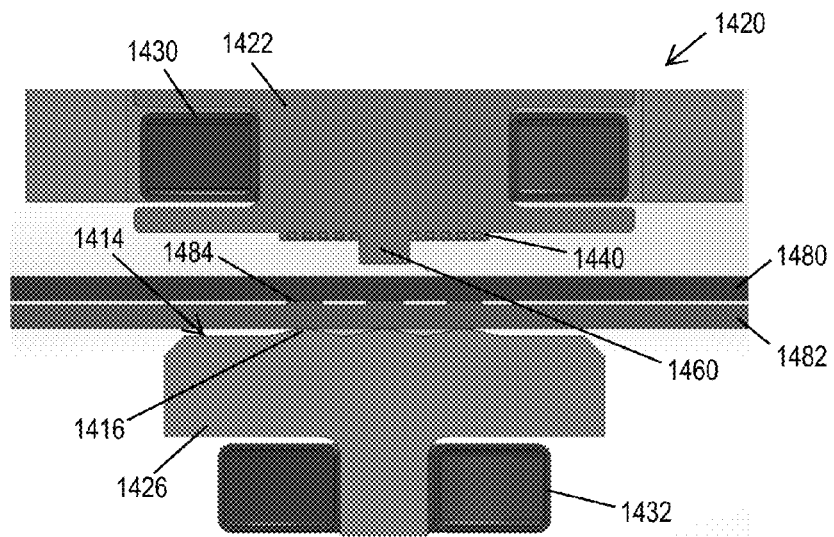
FIG. 34 is a sectional view of a friction stir weld apparatus configured to create a joint between a top and a bottom object.
Figure 35:
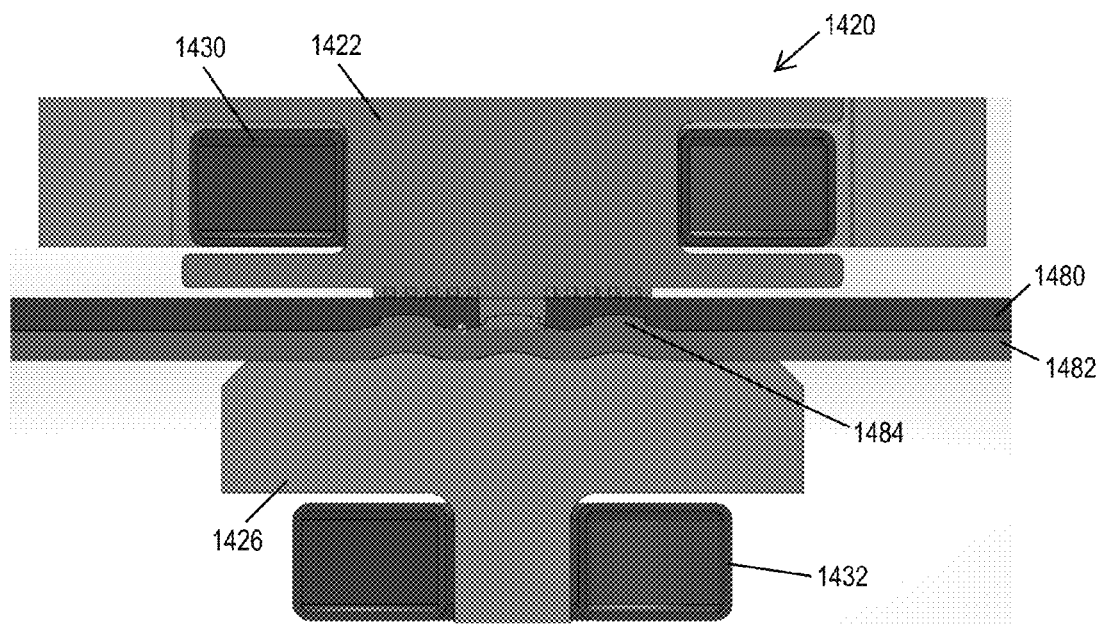
FIG. 35 is a sectional view of the friction stir welding apparatus of FIG. 34 shown during the bonding process.

Referring now to FIGS. 34 and 35, interlocking features of the present invention may be used to temporarily join dissimilar materials while, for example, an adhesive cures and/or provide some mechanical joining advantages in addition to the adhesive bonded joint. A friction stir weld apparatus 1420 having similar components and functionality as friction stir weld apparatus 20 discussed above comprises a spindle 1422 and a base 1426. A top object 1480 and a bottom object 1482 to be joined are supported on base 1426. Bottom object 1482 has one or more raised elements or interlocking features 1484. At the bottom of spindle 1422 is a stir weld tool 1440 having a shaft 1460. In the case where top object 1480 is a composite or plastic material, top object 1480 may have a through-hole (not show) for receiving shaft 1460. As spindle 1422 rotates and is lowered toward base 1426, shaft 1460 protrudes through top object 1480 and engages bottom object 1482. Frictional heat causes warming and softening of objects 1480 and 1482 while apparatus 1420 clamps objects 1480 and 1482 between spindle 1422 and base 1426. As objects 1480 and 1482 soften, the downward pressure of spindle 1422 causes interlocking features 1484 of bottom object 1482 to lock with top object 1480, forming a joint between the two materials.

Optionally, base top surface 1414 may have one or more raised elements 1416 generally corresponding to interlocking features 1484. As bottom object 1482 softens, the downward pressure of spindle 1422 causes bottom object 1482 to deform around raised elements 1416, strengthening the joint.

Optionally, an upper coil 1430 and/or a lower coil 1432 may be used to preheat spindle 1422, tool 1440, base 1426, and/or one or both objects 1480 and 1482 through induction heating as described above.

While each of the embodiments above are described in the context of joining two objects or pieces of material together, it is envisioned that any number of objects of similar or different material may be joined.

Therefore, the present invention provides heat assisted friction stir welding and a fastener for use therewith. The present invention enables the joining of difficult to bond materials such as dissimilar metals or metal with plastic or composite material, and does so in a way that produces a stronger bond with lower energy input than existing techniques. This enables the integration of materials into structures that would not otherwise be possible and allows designers to choose the best materials based on design requirements.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A friction stir weld fastener system that is configured to fasten two or more objects together via friction stir welding, said fastener system comprising:
   a fastener comprising a head and a shaft portion, wherein said shaft portion is configured to protrude through a first object and wherein, when said shaft portion protrudes through the first object, said shaft portion engages a second object, and wherein said head of said fastener does not protrude through the first object; and
   wherein, at least when protruding through the first object and engaging the second object, said fastener is moved relative to the first and second objects to friction stir weld said fastener to at least the second object, whereby said fastener fastens the first and second objects together.

2. The friction stir weld fastener system of claim 1, wherein said fastener is configured to join dissimilar materials and the first and second objects comprise dissimilar materials.

3. The friction stir weld fastener system of claim 2, wherein said fastener is configured to join metals of different alloys.

4. The friction stir weld fastener system of claim 2, wherein said fastener is configured to join metals to non-metals.

5. The friction stir weld fastener system of claim 4, wherein said fastener is configured to join metals to plastics.

6. The friction stir weld fastener system of claim 4, wherein said fastener is configured to join composites to metals.

7. The friction stir weld fastener system of claim 1, comprising a heat source, wherein the friction stir welding of said fastener to at least the second object is assisted by said heat source.

8. The friction stir weld fastener system of claim 7, where said heat source is magnetic.

9. The friction stir weld fastener system of claim 7, wherein said heat source is resistive.

10. The friction stir weld fastener system of claim 7, wherein said heat source is radiant.

11. The friction stir weld fastener system of claim 1, wherein said fastener is configured to be self-drilling.

12. The friction stir weld fastener system of claim 1, wherein said fastener is configured to be self-machining.

13. The friction stir weld fastener system of claim 1, wherein said fastener comprises one or more materials and wherein at least one of the materials of said fastener is selected having a magnetic curie temperature that at least partially provides heat at a self-regulated temperature.

14. The friction stir weld fastener system of claim 1, wherein said fastener incorporates an adhesive, foam, elastomer or polymer.

15. The friction stir weld fastener system of claim 1, wherein said fastener is moved relative to the first and second objects to friction stir weld said fastener to the first and second objects.

16. The friction stir weld fastener system of claim 1, wherein said fastener is at least one of (i) rotated relative to the first and second objects to friction stir weld said fastener to at least the second object and (ii) oscillated relative to the first and second objects to friction stir weld said fastener to at least the second object and (iii) vibrated relative to the first and second objects to friction stir weld said fastener to at least the second object.

17. The friction stir weld fastener system of claim 1, wherein an end portion of said shaft portion of said fastener comprises at least one rib and an end portion of said head of said fastener comprises at least one rib, and wherein, when said fastener is moved to friction stir weld said fastener to the first and second objects, said ribs of said shaft portion and said head embed into the respective objects.

18. A friction stir weld system that is configured to fasten two or more objects together via friction stir welding and riveting, said system comprising:
   a fastener comprising a head and a shaft portion, wherein said shaft portion is configured to protrude through a first object and wherein, when said shaft portion protrudes through the first object, said shaft portion engages a second object, and wherein the head of said fastener does not protrude through the first object; and
   wherein said fastener is moved relative to the first and second objects to friction stir weld said fastener to at least the first object, and riveted by upsetting at least a portion of said shaft portion into the second object, whereby said fastener fastens the first and second objects together.

19. The friction stir weld system of claim 18, wherein said fastener is configured to join dissimilar materials and the first and second objects comprise dissimilar materials, and wherein at least one of (i) said fastener is configured to join metals of different alloys, (ii) said fastener is configured to join metals to non-metals, (iii) said fastener is configured to join metals to plastics and (iv) said fastener is configured to join composites to metals.

20. The friction stir weld system of claim 18, wherein said friction stir welding of said fastener to the first and second objects is assisted by a heat source.

21. The friction stir weld system of claim 18, wherein an end portion of said head comprises at least one rib, and wherein, when said fastener is moved to friction stir weld said fastener to the first object, said at least one rib of said head mixes into the first object.

22. A method of friction stir welding two or more objects together, said method comprising:
providing a fastener having a head and a shaft portion;
providing first and second objects and arranging the first and second objects next to each other at said fastener;
moving, via a driving device, said fastener and driving said shaft portion into at least the second object;
wherein, as said fastener is movably driven, said shaft portion protrudes through the first object and engages the second object, and wherein said head of said fastener does not protrude through the first object; and
wherein, responsive to movable driving of said fastener, said fastener fastens and friction stir welds the first and second objects together.

23. The method of claim 22, further comprising heating at least one of the first and second objects prior to beginning moving said fastener to friction stir weld the first and second objects together.

24. The method of claim 22, wherein said fastener is configured to join dissimilar materials and wherein the first object comprises a first material and the second object comprises a second material, and wherein the first and second materials are dissimilar materials.

25. The method of claim 24, wherein said first and second materials comprise different alloys.

26. The method of claim 24, wherein one of said first and second materials comprises a metallic material and the other of said first and second materials comprises a non-metallic material.

27. The method of claim 24, wherein one of said first and second materials comprises a metallic material and the other of said first and second materials comprises a plastic material.

28. The method of claim 22, wherein said fastener is configured to be self-drilling and wherein, as said fastener is movably driven, said shaft portion of said fastener drills into at least the second object.

29. The method of claim 22, wherein an end portion of said shaft portion comprises at least one rib and an end portion of said head comprises at least one rib, and wherein, as said fastener is movably driven, said ribs of said head and said shaft portion embed into the respective first and second objects.

30. The method of claim 22, wherein moving said fastener comprises rotating said fastener via a rotational driving device.

\* \* \* \* \*